(12) United States Patent
Murata

(10) Patent No.: US 9,848,256 B2
(45) Date of Patent: Dec. 19, 2017

(54) HOLDER ATTACHMENT FOR DRUM

(71) Applicant: KABUSHIKI KAISHA AUDIO-TECHNICA, Tokyo (JP)

(72) Inventor: Takashi Murata, Tokyo (JP)

(73) Assignee: KABUSHIKI KAISHA AUDIO TECHNICA, Tokyo (JP)

( * ) Notice: Subject to any disclaimer, the term of this patent is extended or adjusted under 35 U.S.C. 154(b) by 0 days.

(21) Appl. No.: 15/252,291

(22) Filed: Aug. 31, 2016

(65) Prior Publication Data
US 2017/0064425 A1 Mar. 2, 2017

(30) Foreign Application Priority Data

Aug. 31, 2015 (JP) ................. 2015-171318

(51) Int. Cl.
| | |
|---|---|
| G10G 5/00 | (2006.01) |
| H04R 1/08 | (2006.01) |
| H04R 1/02 | (2006.01) |
| F16B 2/00 | (2006.01) |
| F16B 2/06 | (2006.01) |
| F16M 13/02 | (2006.01) |
| G10D 13/02 | (2006.01) |
| G10G 7/00 | (2006.01) |

(52) U.S. Cl.
CPC .............. *H04R 1/08* (2013.01); *F16B 2/005* (2013.01); *F16B 2/065* (2013.01); *F16M 13/022* (2013.01); *G10D 13/02* (2013.01); *G10G 7/00* (2013.01); *H04R 1/02* (2013.01)

(58) Field of Classification Search
CPC ........... A01K 97/10; H04R 1/08; F16B 2/005; F16B 2/065
See application file for complete search history.

(56) References Cited

U.S. PATENT DOCUMENTS

| | | | |
|---|---|---|---|
| 2,524,518 A | 10/1950 | D Arcy | |
| 4,939,972 A | 7/1990 | Falberg | |
| 5,046,700 A * | 9/1991 | Hoshino | G10D 13/026 248/632 |
| 5,684,258 A * | 11/1997 | Liao | G10D 13/00 224/910 |
| 6,424,723 B1 * | 7/2002 | Jing | H04R 1/08 381/361 |
| 6,757,400 B1 * | 6/2004 | Cheng | H04R 1/08 381/361 |
| 7,045,696 B2 * | 5/2006 | Henry | G10D 13/023 84/411 R |
| 9,544,674 B2 * | 1/2017 | Murata | H04R 1/08 |
| 2006/0081116 A1 | 4/2006 | Copeland | |
| 2009/0020677 A1 | 1/2009 | Crous | |

FOREIGN PATENT DOCUMENTS

| | | |
|---|---|---|
| DE | 20013205 U1 | 9/2000 |
| JP | 2009-94851 A | 4/2009 |

* cited by examiner

*Primary Examiner* — Amy Sterling
(74) *Attorney, Agent, or Firm* — Whitham, Curtis & Cook

(57) ABSTRACT

A holder attachment for a drum secures a component to a drum, adds no excess load on the rim of the drum, and reduces effects on the tension applied to the drum head. The holder attachment for the drum includes a holding part configured to hold a component to be attached to the drum, and an attaching unit to be attached to the tension bolt of the drum. The holding part is connected to the attaching unit.

17 Claims, 10 Drawing Sheets

HOLDER ATTACHMENT FOR DRUM

TECHNICAL FIELD

The present invention relates to a holder attachment for a drum to attach a microphone or muting component to the drum, for example.

BACKGROUND ART

When collecting drum sounds generated by a drum, a microphone for collecting sounds is disposed near the drum or is attached to the drum, for example.

For attaching a microphone to a drum, a microphone holder attached to the rim fixed to the body of the drum (drum shell) has been proposed (for example, refer to Japanese Unexamined Patent Application Publication No. 2009-94851).

The drum includes a drum shell, a drum head, a rim, and tension bolts. The drum shell has a shape of a cylinder having an open top end and an open bottom end, for example. The drum shell has lugs on its side face. The tension bolts each are to be screwed to the respective lugs. The drum heads are stretched on the drum shell with predetermined tension. The method of adjusting the tension applied to the drum head will now be described. The description below takes the drum head stretched on the top of the drum shell as an example.

The circumferential edge of the drum head is pressed downward along the side face of the drum shell by the rim. Thus, the drum head is stretched on the drum shell with predetermined tension. The tension applied to the drum head is adjusted by the vertical movement of the rim along the side face of the drum shell.

That is, the tension applied to the drum head increases as the rim moves downward. When the drum head stretched with increased tension is beaten, the drum generates a drum sound (beat) with a high tone. On the other hand, the tension applied to the drum head decreases as the rim moves upward. When the drum head with a decreased tension is beaten, the drum generates a drum sound with a low tone.

The tension bolts connect the drum shell and the rim. The tension bolts move the rim in the vertical direction (the direction along the side face of the drum shell). The tension bolts each have a threaded portion screwed in the lug of the drum shell. The threaded portion is disposed in the lower end portion of each tension bolt. The upper end portion of the tension bolt is rotatably attached to the rim. The rim moves in the vertical direction along the side face of the drum shell in conjunction with the rotation of the tension bolts. The rotation of the tension bolts is enabled by a tuning key. When the head of a tension bolt is inserted in the socket of the tuning key, and the tuning key is rotated, the tension bolt then rotates. When the tension bolt rotates, the screwed degree of the tension bolt in the lug then varies. As a result, the rim moves in the vertical direction along the side face of the drum shell. That is, when the screwed degree of the tension bolt in the lug is large, the position of the rim in vertical direction is lower than when the screwed degree of the tension bolt is small. As the rim moves downward, the tension applied to the drum head increases.

As described above, the tone of the drum sound generated by the drum is adjusted (tuned) by the adjustment of the position of the rim in the vertical direction relative to the drum shell.

SUMMARY OF INVENTION

Technical Problem

The microphone holder disclosed in Japanese Unexamined Patent Application Publication No. 2009-94851 is attached to the rim. Thus, the load of the microphone holder and the load of the microphone held by the microphone holder are added to the rim. As a result, an excess load is added to a part of the rim, and thereby the tension applied to the drum head becomes uneven. In particular, the tone of the adjusted drum sound may be affected by the variation in tension. In addition, for example, when the microphone holder is attached to a rim having a thin edge, the microphone holder is difficult to be secured to the rim.

An object of the present invention is to solve the problems described above and to provide a holder attachment for a drum that can reduce effects on the tension applied to the drum head.

Solution to Problem

The holder attachment for a drum according to the present invention includes a holding part configured to hold a component to be attached to the drum and an attaching unit to be attached to the tension bolt of the drum. The holding part is connected to the attaching unit.

According to the present invention, components can be secured to the drum, and an excess load to the rim from the holder attachment for a drum is not added, and thereby effects on the tension applied to the drum head can be reduced.

BRIEF DESCRIPTION OF EMBODIMENTS

DESCRIPTION OF EMBODIMENTS

Embodiments of the holder attachment for a drum according to the present invention will now be described with reference to the attached drawings.

Holder Attachment for a Drum (1)

The structure of the holder attachment for a drum (hereinafter referred to as "holder attachment") according to the present invention will now be described.

Structure of Holder Attachment

Figure 1:
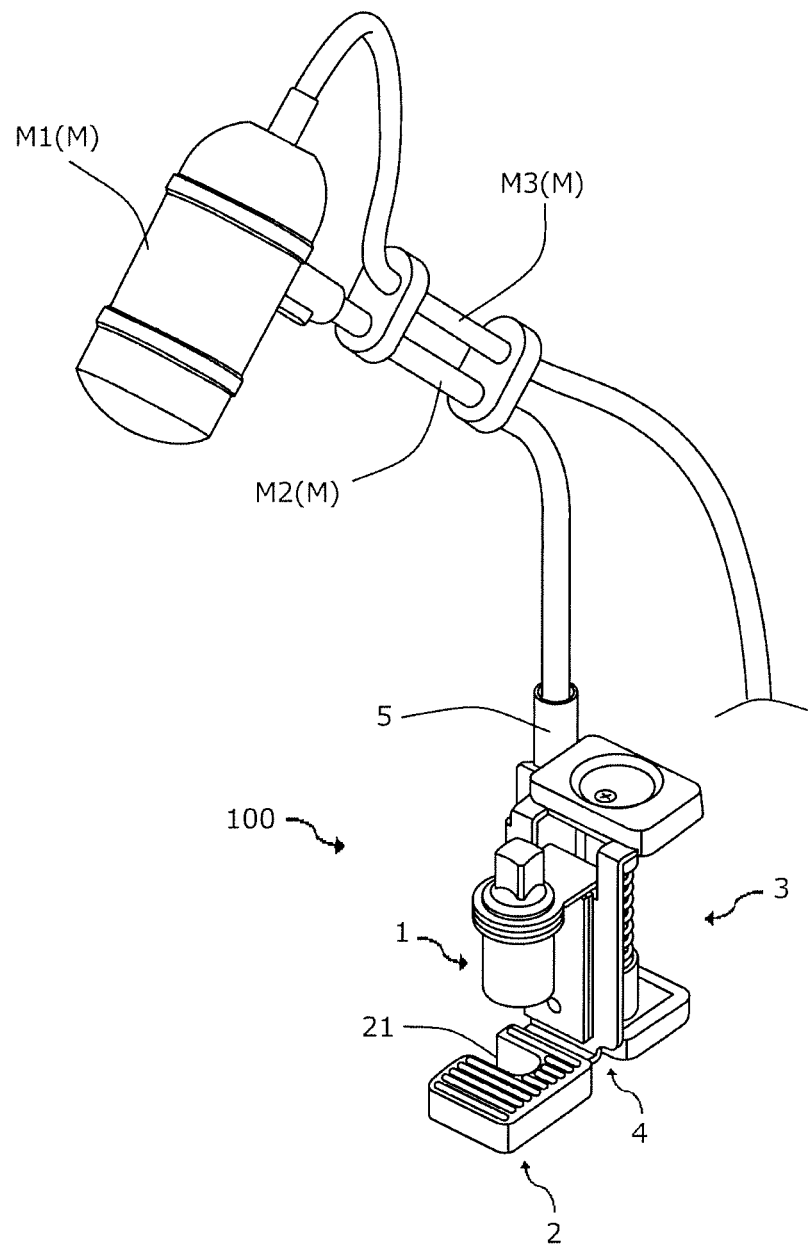
FIG. 1 is a perspective view illustrating an embodiment of a holder attachment for a drum according to the present invention.

FIG. 1 is a perspective view illustrating an embodiment of the holder attachment according to the present invention. A holder attachment 100 includes a first attaching member 1, a second attaching member 2, a distance adjuster 3, a sliding mechanism 4, and a holding part 5. The first attaching member 1 and the second attaching member 2 are connected to the distance adjuster 3 and the holding part 5 with the sliding mechanism 4.

The holder attachment 100 holds a microphone M and attaches the microphone M to a drum D (see FIG. 7, the same applies hereinafter). The microphone M is an example component to be held and attached to the drum D by the holder attachment 100.

The component to be held by the holder attachment may be, for example, a muting component to be contacted with the surface of the drum head D2 (see FIG. 7, the same applies hereinafter) to mute drum sounds.

The microphone M includes a microphone body M1, a support M2, and a cord M3. The microphone body M1 collects voices and musical sounds, for example, and generates electrical signals corresponding to the collected sounds. The microphone body M1 includes a windscreen. The windscreen prevents the microphone body M1 from collecting noises caused by wind pressure of the wind blowing around the microphone body M1. The support M2 supports the microphone body M1. The cord M3 is a transmission line to transmit the electrical signals generated by the microphone body M1 to external devices (not shown), such as a speaker and an amplifier of the microphone M.

The first attaching member 1 and the second attaching member 2 constitute an attaching unit to be attached to a tension bolt D4 of the drum D (see FIG. 7, the same applies hereinafter). The attaching unit is attached to the tension bolt D4, and thereby the holder attachment 100 is attached to the tension bolt D4, as described below. The structure of the drum D to which the holder attachment 100 is attached and the process for attaching the holder attachment 100 to the drum D will be described below.

When the holder attachment 100 is attached to the tension bolt D4, the first attaching member 1 engages with the head D41 of the tension bolt D4 (see FIG. 7, the same applies hereinafter).

When the holder attachment 100 is attached to the tension bolt D4, the second attaching member 2 comes into contact with the bottom face of the rim D3 of the drum D (see FIG. 7, the same applies hereinafter) and clamps the axial body of the tension bolt D4. The second attaching member 2 is disposed below the first attaching member 1.

The distance adjuster 3 is used for varying the distance between the first attaching member 1 and the second attaching member 2 by the operation of a user of the holder attachment 100, for example.

The sliding mechanism 4 connects the attaching unit and the distance adjuster 3. When the distance adjuster 3 is operated, the sliding mechanism 4 varies the distance between the first attaching member 1 and the second attaching member 2 of the attaching unit.

The holding part 5 holds the microphone M.

Figure 2:
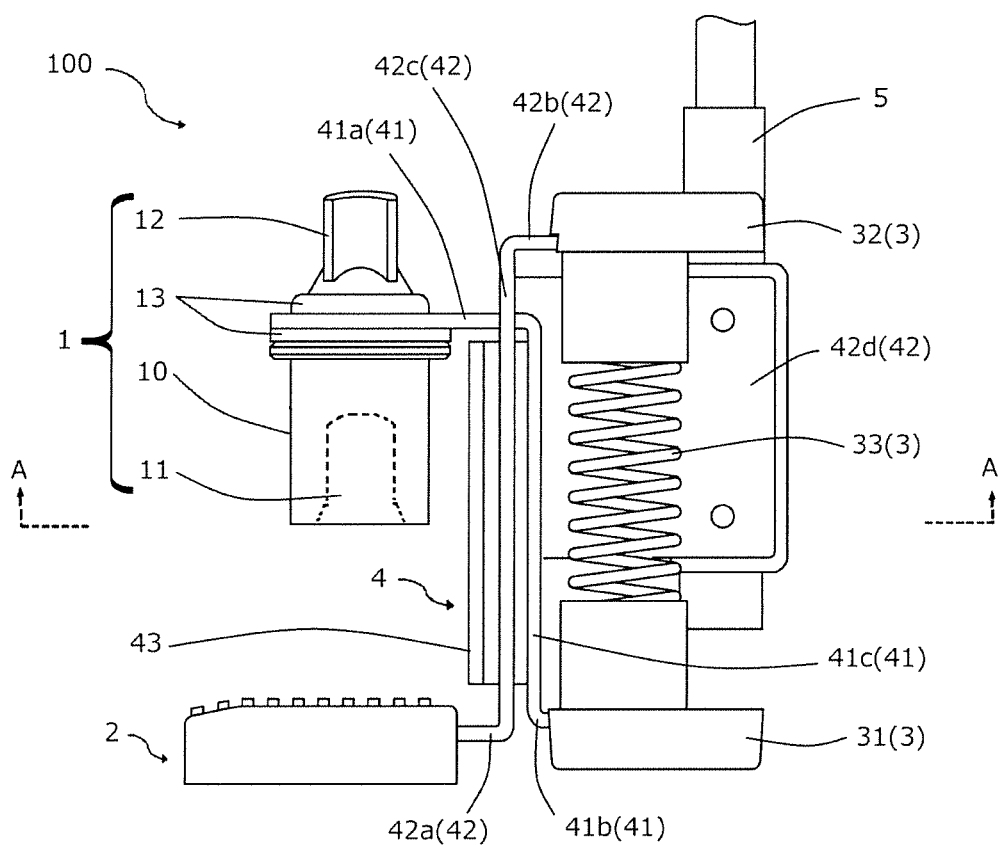
FIG. 2 is a front view of the holder attachment for the drum in FIG. 1.

FIG. 2 is a front view of the holder attachment 100.

The first attaching member 1 includes a body 10, a first engaging portion 11, a second engaging portion 12, and a support 13.

The body 10 is rotatably supported by the sliding mechanism 4 with the support 13. The body 10 has a shape of a substantial column. The body 10 has a groove (not shown). The groove is disposed on the side face of the body 10 in the circumferential direction.

When the holder attachment 100 is attached to the tension bolt D4, the first engaging portion 11 engages with the head D41 of the tension bolt D4. As described below, the first engaging portion 11 is a hole. The first engaging portion 11 has an opening that can receive the head D41 of the tension bolt D4 therein. The first engaging portion 11 is disposed at the substantial center of the bottom face (the face of the lower side in FIG. 2) of the body 10.

When the tension applied to the drum head D2 (described below) is adjusted, the second engaging portion 12 engages with a tuning key T (see FIG. 8, the same applies hereinafter) for rotating the tension bolt D4. The second engaging portion 12 has an external shape substantially identical to that of the head D41 of the tension bolt D4. The second engaging portion 12 projects upward from the top face (the face of the upper side in FIG. 2) of the body 10.

The support 13 rotatably supports the body 10 to the sliding mechanism 4. The support 13 has a shape of a doughnut in plan view. The support 13 is fit in the groove on the side face of the body 10. The support 13 has a concave groove. The concave groove is disposed on the outer circumference of the support 13 (see FIG. 9). The circumferential edge defining the supporting hole 41$h$1 of the first support 41 constituting the sliding mechanism 4 is fit in the concave groove, as described below (see FIG. 9).

The second attaching member 2 has a shape of a plate, and includes a clamping portion 21 having a U-shape in plan view (see FIG. 1). The second attaching member 2 includes a frictional member on its top face (the face facing the first attaching member 1 in the upper side in FIG. 2). The frictional member is configured to increase frictional coefficient with the rim D3. The frictional member is composed of rubber, for example. The clamping portion 21 clamps the axial body of the tension bolt D4 when the holder attachment 100 is attached to the tension bolt D4.

The distance adjuster 3 includes a first adjuster segment 31, a second adjuster segment 32, and a biasing member 33.

The first adjuster segment 31 is connected to the first attaching member 1 with a first support 41 described below.

The second adjuster segment 32 is connected to the second attaching member 2 with a second support 42 described below.

The biasing member 33 is disposed between the first adjuster segment 31 and the second adjuster segment 32. The biasing member 33 biases the first adjuster segment 31 and the second adjuster segment 32 in directions opposite to (remote from) each other. The biasing member 33 is a metal spring, for example.

The sliding mechanism 4 includes a first support 41, a second support 42, and a sliding member 43.

Figure 3:
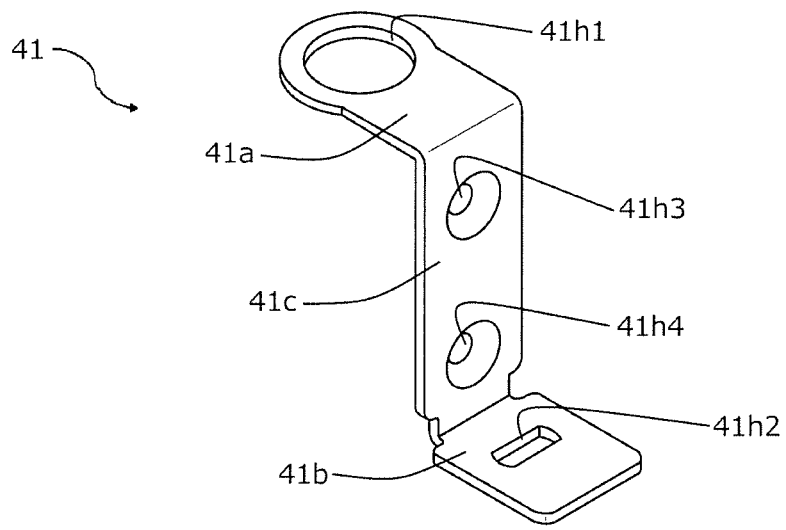
FIG. 3 is a perspective view of a first support of a sliding mechanism of the holder attachment for the drum in FIG. 2.

FIG. 3 is a perspective view of the first support 41. The first support 41 includes a first supporting flange portion 41$a$, a second supporting flange portion 41$b$, and vertical portion 41$c$.

The first support 41 is a metal plate. The first support 41 is bent at both ends in longitudinal direction of the first support 41. The first supporting flange portion 41$a$ is a portion of one end (the upper side of FIG. 3) of the first support 41 and is bent along a first bending line in a direction orthogonal to the longitudinal direction of the first support 41. The first supporting flange portion 41$a$ has a surface extending from the first bending line. The second supporting flange portion 41b is a portion of the other end (the lower side of FIG. 3) of the first support 41 and is bent along a second bending line in a direction orthogonal to the longitudinal direction of the first support 41. The second supporting flange portion 41b has a surface extending from the second bending line. The first bending line adjacent to the first supporting flange portion 41a is parallel to the second bending line adjacent to the second supporting flange portion 41b. The bending direction of the first supporting flange portion 41a is opposite to the bending direction of the second supporting flange portion 41b. The surface of the first supporting flange portion 41a is parallel to the surface of the second supporting flange portion 41b. The vertical portion 41c is a middle portion disposed between the first supporting flange portion 41a and the second supporting flange portion 41b of the first support 41.

The first supporting flange portion 41a rotatably supports the first attaching member 1. The first supporting flange portion 41a has a supporting hole 41h1. The circumferential edge defining the supporting hole 41h1 is fit in the concave groove on the outer circumference of the support 13 of the first attaching member 1. The support 13 is thereby attached in the supporting hole 41h1.

Figure 9:
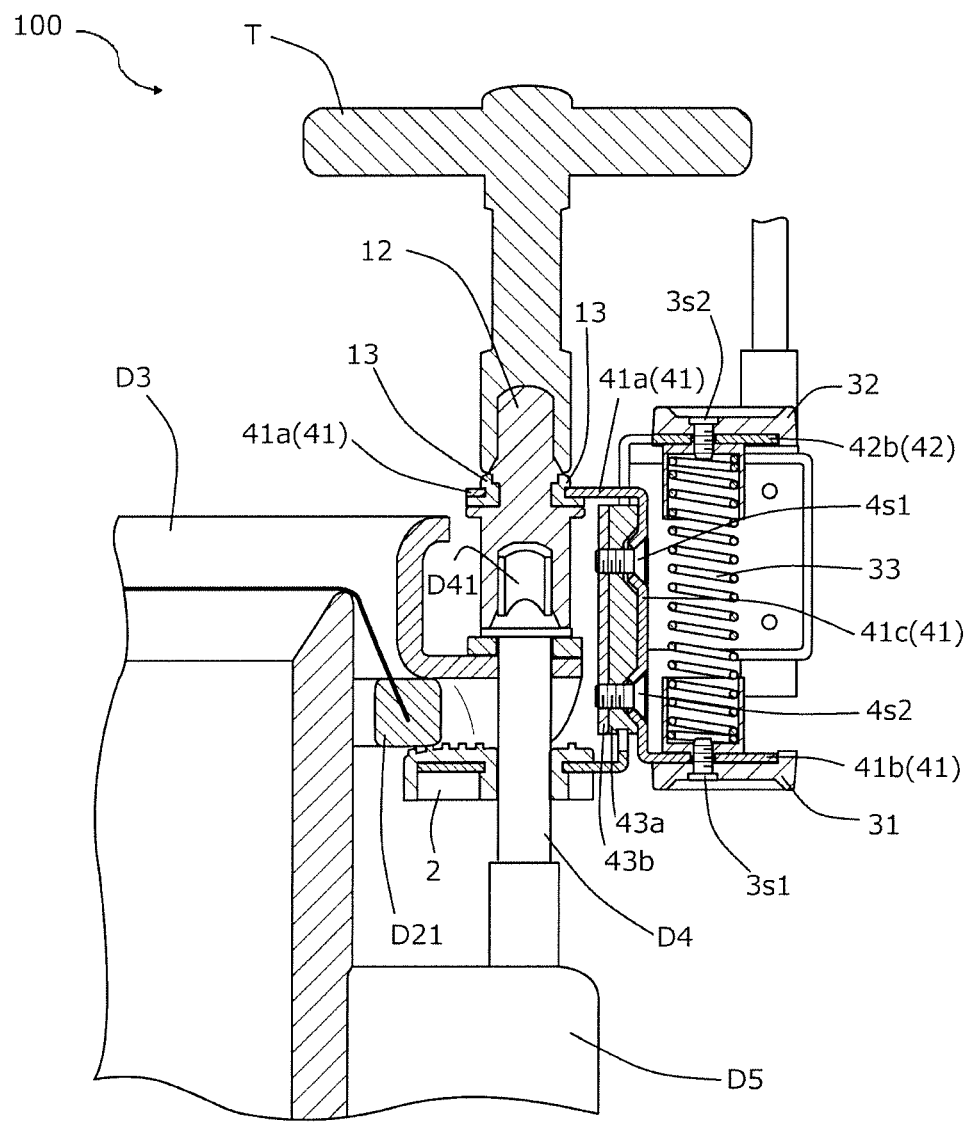
FIG. 9 is a partial cross-sectional view of the holder attachment for the drum in FIG. 8.

The second supporting flange portion 41b is fastened to the first adjuster segment 31 with a screw 3s1 (see FIG. 9). The second supporting flange portion 41b has a screw hole 41h2 into which the screw 3s1 is to be inserted.

The vertical portion 41c is fastened to the sliding member 43 with screws 4s1 and 4s2 (see FIG. 9). The vertical portion 41c has screw holes 41h3 and 41h4 into which the screws 4s1 and 4s2 respectively inserted. The screw holes 41h3 and 41h4 are in communication with the respective screw holes 43h3 and 43h4 (described below) of the sliding member 43 (see FIG. 5).

Figure 4:
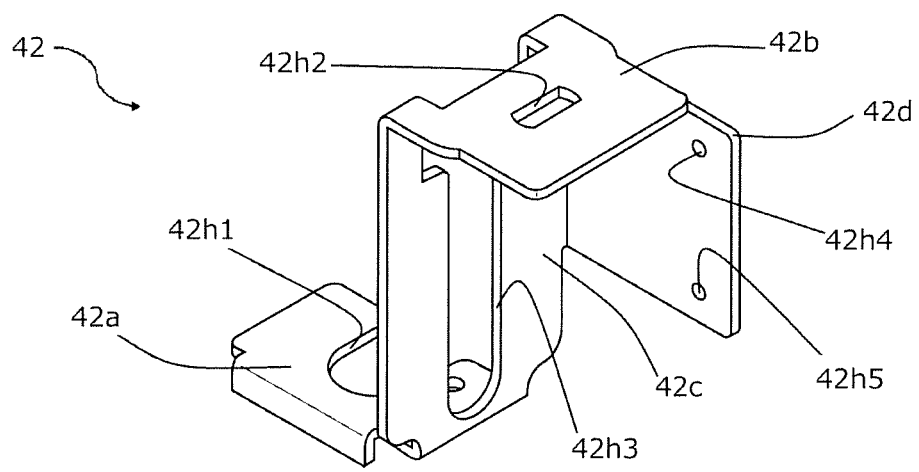
FIG. 4 is a perspective view of a second support of the sliding mechanism of the holder attachment for the drum in FIG. 2.

FIG. 4 is a perspective view of the second support 42. The second support 42 includes a first supporting flange portion 42a, a second supporting flange portion 42b, a vertical portion 42c, and a holder support 42d.

The second support 42 is a metal plate. Parts of the second support 42 are bent. The first supporting flange portion 42a is a portion of one end (the lower side of FIG. 4) of the second support 42 in the longitudinal direction and is bent along a first bending line in a direction orthogonal to the longitudinal direction of the second support 42. The second supporting flange portion 42b is a portion of the other end (the upper side of FIG. 4) of the second support 42 in the longitudinal direction and is bent along a second bending line in the direction orthogonal to the longitudinal direction of the second support 42. The first bending line adjacent to the first supporting flange portion 42a is parallel to the second bending line adjacent to the second supporting flange portion 42b. The bending direction of the first supporting flange portion 42a is opposite to the bending direction of the second supporting flange portion 42b. The extending direction of the first supporting flange portion 42a is parallel to the extending direction of the second supporting flange portion 42b. The vertical portion 42c is a middle portion disposed between the first supporting flange portion 42a and the second supporting flange portion 42b of the second support 42. The holder support 42d is a portion of the second support 42 extending from one longitudinal side of the vertical portion 42c. The holder support 42d is bent along a third bending line in the longitudinal direction of the second support 42. The bending direction of the holder support 42d is the same as the bending direction of the second supporting flange portion 42b.

The second attaching member 2 is fixed to the first supporting flange portion 42a. The first supporting flange portion 42a is fit in a groove on the second attaching member 2, for example, so as to be fixed to the second attaching member 2. The first supporting flange portion 42a has a supporting hole 42h1 having a U-shape in plan view.

The second adjuster segment 32 is fastened to the second supporting flange portion 42b with a screw 3s2 (see FIG. 9). The second supporting flange portion 42b has a screw hole 42h2 into which the screw 3s2 is to be inserted.

The sliding member 43 is engaged slidably with the vertical portion 42c. The vertical portion 42c has a sliding hole 42h3 in which the sliding member 43 is to be engaged. The sliding hole 42h3 extends in the longitudinal direction (the vertical direction in FIG. 4) of the second support 42.

The holding part 5 is fastened to the holder support 42d holding part 5 with screws (not shown). The holder support 42d has screw holes 42h4 and 42h5 into which the screws are to be inserted.

Figure 5:
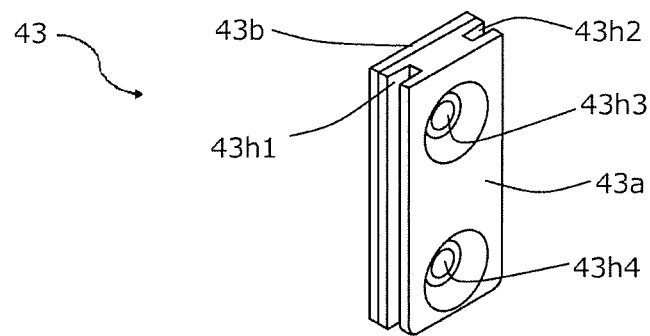
FIG. 5 is a perspective view of a sliding member of the sliding mechanism of the holder attachment for the drum in FIG. 2.

FIG. 5 is a perspective view of the sliding member 43. The sliding member 43 includes a body 43a and a screw receiver 43b.

The body 43a is fastened to the first support 41 with the screws 4s1 and 4s2 (see FIG. 9). The body 43a has a rectangular shape in side view (the view from the left to the right in FIG. 2). The body 43a has screw holes 43h3 and 43h4 into which the respective screws 4s1 and 4s2 are to be inserted.

The second support 42 is engaged slidably with the body 43a. The body 43a has an H-shape in plan view. The body 43a has concave grooves 43h1 and 43h2. The concave groove 43h1 extends on the front (the front side of FIG. 5) face of the body 43a in the longitudinal direction (the vertical direction in FIG. 5) of the body 43a. The concave groove 43h2 extends on the back (the back side of FIG. 5) face of the body 43a in the longitudinal direction of the body 43a. The concave grooves 43h1 and 43h2 are engaged with the circumferential edge defining the sliding hole 42h3 of the second support 42. The body 43a is slidable along the sliding hole 42h3.

The screw receiver 43b is fastened to the body 43a with screws (not shown). The screw receiver 43b has a rectangular shape that is the same as the shape of the body 43a in side view (the view from the left to the right in FIG. 2).

Figure 6:
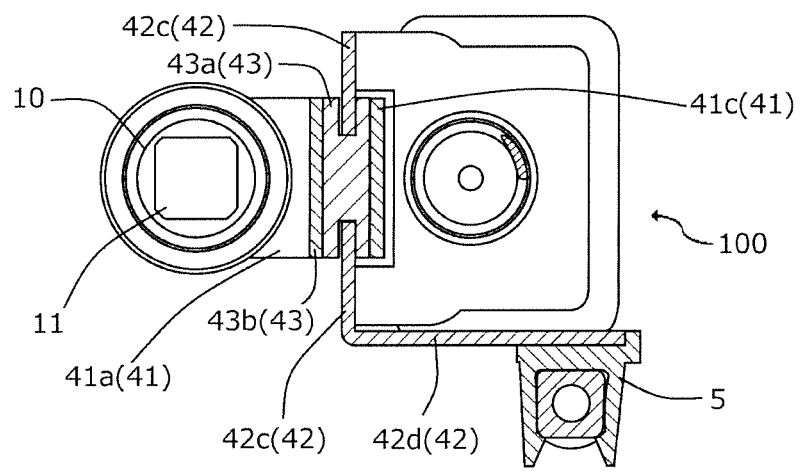
FIG. 6 is a cross-sectional view of the holder attachment for the drum taken from the line A-A in FIG. 2.

FIG. 6 is a cross-sectional view of the holder attachment 100 taken from the line A-A of FIG. 2. The connecting structure among the first support 41, the second support 42, and the sliding member 43 will now be described.

The vertical portion 41c of the first support 41 is fixed to the body 43a of the sliding member 43. Thus, the positional relationship between the first supporting flange portion 41a of the first support 41 connected to the vertical portion 41c and the sliding member 43 is fixed. That is, the distance between the first supporting flange portion 41a and the sliding member 43 is constant. In other words, the distance between the support 13 and the body 10 (having the first engaging portion 11) of the first attaching member 1 supported rotatably by the first supporting flange portion 41a, and the sliding member 43 is constant.

The circumferential edge defining the sliding hole 42h3 of the vertical portion 42c of the second support 42 is engaged slidably with the concave grooves 43h1 and 43h2 of the body 43a. That is, the second support 42 is slidable relative to the sliding member 43 in the front and back direction in FIG. 6. The vertical portion 42c is connected to the holder support 42*d* to which the holding part 5 is fastened. The screw receiver 43*b* of the sliding member 43 is fixed to the body 43*a*.

As described above, the first support 41 is connected to the second support 42 with the sliding member 43. Among the first support 41 and the second support 42, only the second support 42 is slidable to the sliding member 43.

As shown in FIG. 2, the first attaching member 1 is connected to the first adjuster segment 31 with the first support 41. The first attaching member 1 is supported rotatably by the first supporting flange portion 41*a* of the first support 41. The first adjuster segment 31 is fixed to the second supporting flange portion 41*b* of the first support 41.

The second attaching member 2 is connected to the second adjuster segment 32 with the second support 42. The second attaching member 2 is fixed to the first supporting flange portion 42*a* of the second support 42. The second adjuster segment 32 is fixed to the second supporting flange portion 42*b* of the second support 42.

In the description below, the distance between the first supporting flange portion 41*a* and the first supporting flange portion 42*a* is referred to as a first distance. The distance between the second supporting flange portion 41*b* and the second supporting flange portion 42*b* is referred to as a second distance.

As described above, the first support 41 is connected to the second support 42 with the sliding member 43. Thus, as the second distance decreases, the first distance increases. As the second distance increases, the first distance decreases.

The holding part 5 has a hole into which the holder support 42*d* is to be fit, and an insertion hole into which the support M2 of the microphone M is to be inserted. That is, when one end of the support M2 of the microphone M is inserted in the insertion hole in the holding part 5 and fixed, then the microphone M is supported by the holder attachment 100. The microphone body M1 is connected to the other end of the support M2.

Figure 7:
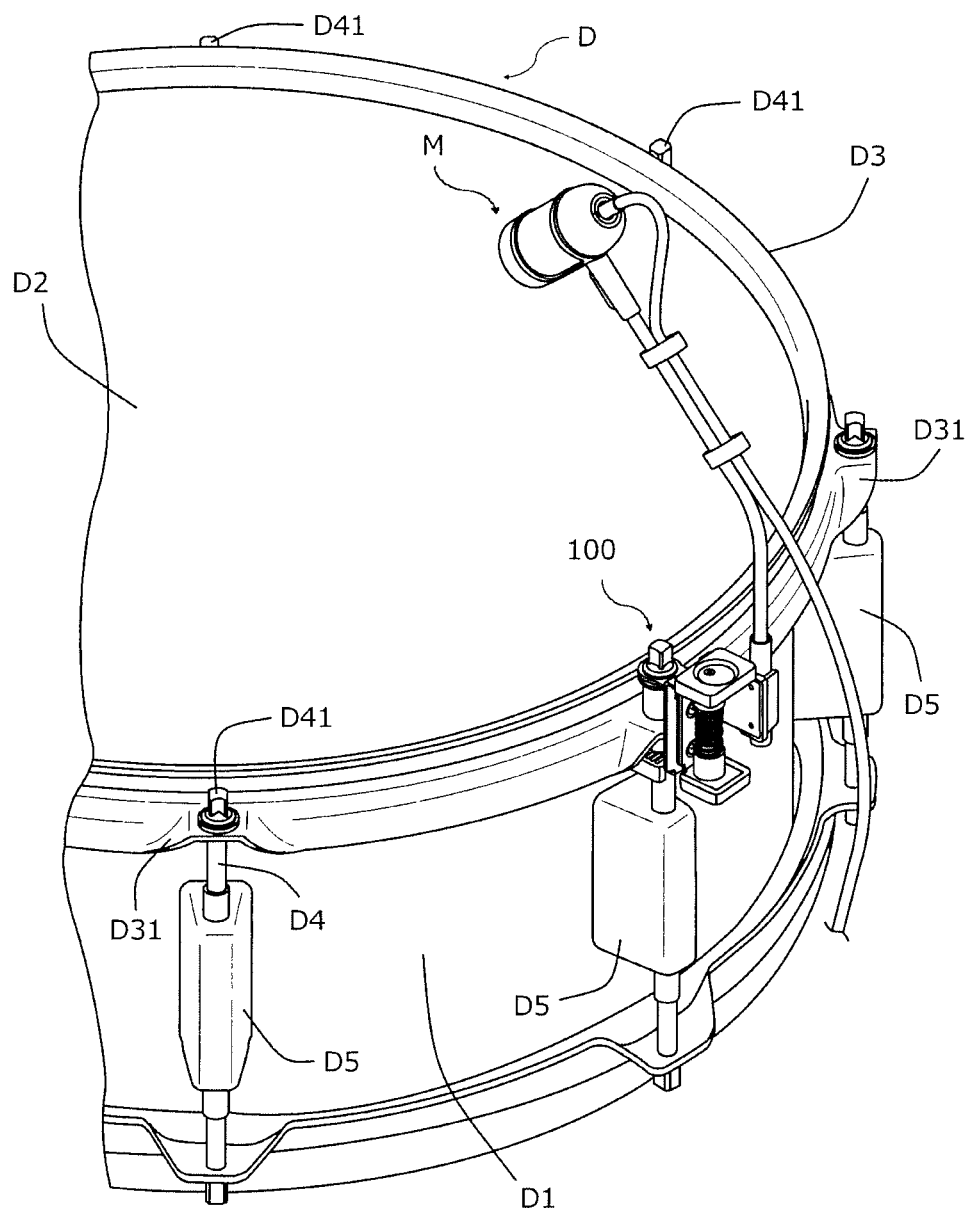
FIG. 7 is a perspective view of the holder attachment for the drum in FIG. 1, attached to the drum.

FIG. 7 is a perspective view of the holder attachment 100 attached to the drum D.

The structure of the drum D will now be described. The drum D includes a drum shell D1, a drum head D2, a rim D3, tension bolts D4, and lugs D5.

The drum shell D1 is a body of the drum D. The drum shell D1 has a shape of a cylinder with an open top end and an open bottom end. The drum shell D1 is composed of wood, for example.

The drum head D2 covers the open top end of the drum shell D1. The drum head D2 is composed of plastic film, for example.

The rim D3 rotatably supports the tension bolts D4. The rim D3 applies a predetermined tension to the drum head D2 and fixes (holds) the drum head D2 to the drum shell D1. The rim D3 is composed of metal, for example, and has a shape of a ring in plan view. The rim D3 has plural supports D31 supporting the tension bolts D4. That is, the rim D3 and the lugs D5 (described below) support the plural tension bolts D4. The plural supports D31 are disposed on the outer circumference of the rim D3 at equal intervals in circumferential direction of the rim D3. Each support D31 has an insertion hole (not shown) into which the upper (the upper side of FIG. 7) end of the tension bolt D4 is to be inserted.

The tension bolts D4 fix the drum head D2 to the drum shell D1. The tension bolts D4 move the rim D3 in vertical direction to adjust the tension applied to the drum head D2. Each tension bolt D4 has a shape of a bar. The tension bolts D4 are composed of metal, for example.

The lugs D5 rotatably support the respective tension bolts D4. The lugs D5 are composed of metal, for example. The lugs D5 are fixed to the drum shell D1 with screws (not shown). The plural lugs D5 are disposed on the side face of the drum shell D1 at equal intervals in circumferential direction of the drum shell D1. Each lug D5 has an insertion hole into which the externally threaded portion of the lower (the lower side of FIG. 7) end of the tension bolt D4 is to be inserted. Each lug D5 has an internally threaded portion on the inner circumference of the insertion hole. The lower end of the tension bolt D4 is screwed in the insertion hole of the lug D5 so as to be fastened to the lug D5.

Process for Attaching Holder Attachment

The process for attaching the holder attachment 100 to the drum D will now be described.

The first adjuster segment 31 and the second adjuster segment 32 are respectively pressed with two fingers of the user of the holder attachment 100, so that the distance between the first adjuster segment 31 and the second adjuster segment 32 is reduced. That is, the first adjuster segment 31 and the second adjuster segment 32 come closer to each other (i.e., the second distance is reduced) against the biasing force of the biasing member 33. As a result, the distance between the first attaching member 1 that is connected to the first adjuster segment 31 with the first support 41 and the second attaching member 2 that is connected to the second adjuster segment 32 with the second support 42 (i.e., the first distance) increases. That is, the first attaching member 1 and the second attaching member 2 move away from each other.

While the first distance between the first attaching member 1 and the second attaching member 2 is increased, the inner circumference of the clamping portion 21 of the second attaching member 2 is brought into contact with the axial body of the tension bolt D4. Then, the clamping portion 21 is attached to the axial body of the tension bolt D4 at the position below the support D31 of the rim D3. The upper surface of the second attaching member 2 is in contact with or is distant from the bottom face (the face in lower side in FIG. 7) of the rim D3. On the other hand, the first attaching member 1 is disposed above the head D41 of the tension bolt D4.

The pressing force applied to the first adjuster segment 31 and the second adjuster segment 32 is then released. As a result, the first adjuster segment 31 and the second adjuster segment 32 are moved away from each other by the biasing force of the biasing member 33. In other words, the distance between the first adjuster segment 31 and the second adjuster segment 32 (i.e., the second distance) increases. As the second distance increases, the first distance decreases. That is, the first attaching member 1 and the second attaching member 2 come closer to each other. Then, the second attaching member 2 comes into contact with the bottom face of the rim D3, or the contact between the second attaching member 2 and the rim D3 is maintained. On the other hand, the head D41 of the tension bolt D4 is inserted in the first engaging portion 11 of the first attaching member 1 disposed above the head D41.

As described above, while the second attaching member 2 is in contact with the bottom face of the rim D3 and clamps the tension bolt D4, the first attaching member 1 is engaged with the head D41 of the tension bolt D4. That is, the attaching unit is attached to the tension bolt D4 by the biasing force of the biasing member 33. As a result, the holder attachment 100 is attached to the drum D by the biasing force of the biasing member 33.

Process for Adjusting Tension Applied to Drum Head D2

The process for adjusting the tension applied to the drum head D2 of the drum D to which the holder attachment 100 is attached will now be described.

Figure 8:
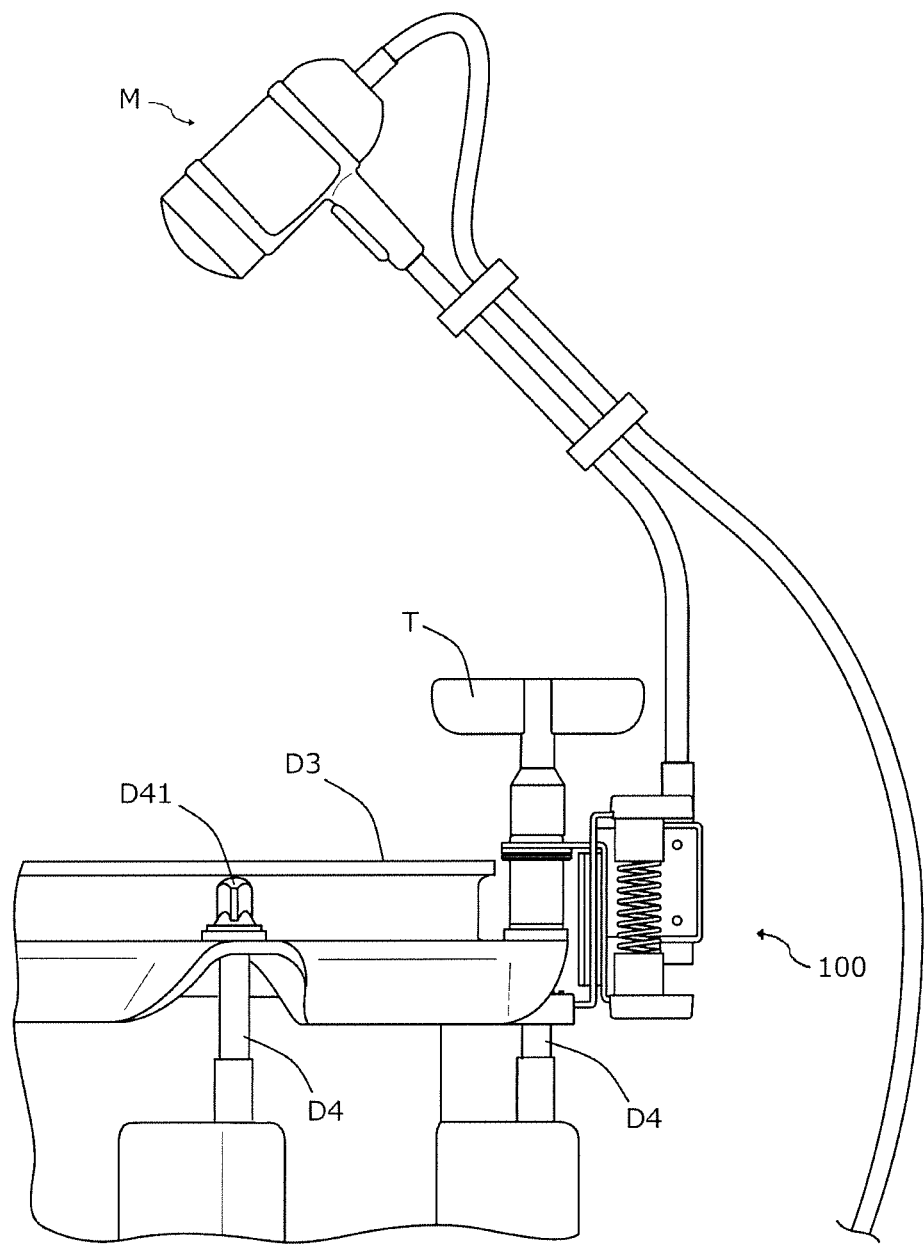
FIG. 8 is a front view of the holder attachment for the drum in FIG. 7.

FIG. 8 is a front view of the holder attachment 100 attached to the drum D. In FIG. 8, a tuning key T is engaged with the second engaging portion 12 of the first attaching member 1 of the holder attachment 100. That is, the second engaging portion 12 is inserted in the socket of the tuning key T.

FIG. 9 is a partial cross-sectional view of the holder attachment 100 of FIG. 8. The head D41 of the tension bolt D4 engages with the first engaging portion 11 of the first attaching member 1. The second engaging portion 12 of the first attaching member 1 engages with the tuning key T.

The first attaching member 1 is rotatably supported by the first support 41 with the support 13. As described above, the concave groove is disposed on the outer circumference of the support 13. The circumferential edge defining the supporting hole 41h1 of the first support 41 is fit in the concave groove.

The surface (the surface of the upper side in FIG. 9) of the second attaching member 2 having a frictional member is in contact with the bottom face of the rim D3. The clamping portion 21 of the second attaching member 2 clamps the axial body of the tension bolt D4.

The first support 41 and the sliding member 43 are fastened to each other with the screw 4s1 inserted in the screw hole 41h3 of the first support 41 and the screw 4s2 inserted in the screw hole 41h4 of the first support 41.

The first adjuster segment 31 has a screw hole. The first adjuster segment 31, the second supporting flange portion 41b, and a holding member holding one end (the lower side of FIG. 9) of the biasing member 33 are fastened with a screw 3s1 inserted in the screw hole of the first adjuster segment 31.

The second adjuster segment 32 has a screw hole. The second adjuster segment 32, the second supporting flange portion 42b, and a holding member holding the other end (the upper side of FIG. 9) of the biasing member 33 are fastened with a screw 3s2 inserted in the screw hole of the second adjuster segment 32.

The rim D3 presses the circumferential edge portion D21 of the drum head D2 downward along the side face of the drum shell D1 so that the drum head D2 is held by the drum shell D1 with a predetermined tension.

The tuning key T engaged with the second engaging portion 12 is turned (rotates) with the fingers of the user of the holder attachment 100. In conjunction with the rotation of the tuning key T, the first attaching member 1 rotates in the same direction as the tuning key T. In conjunction with the rotation of the first attaching member 1, the tension bolt D4 engaged with the first engaging portion 11 rotates in the same direction as the first attaching member 1.

The tension applied to the drum head D2 is adjusted by the movement of the rim D3 in response to the rotation of the tension bolt D4. That is, the rim D3 moves in the vertical direction (the vertical direction in FIG. 8) relative to the drum shell D1 in conjunction with the rotation of the tension bolt D4. As a result, the tension applied to the drum head D2 that is held by the rim D3 at the drum shell D1 varies in response to the movement of the rim D3 relative to the drum shell D1. As described above, the tension applied to the drum head D2 is adjusted by the rotation of the first attaching member 1 in conjunction with the rotation of the tuning key T.

Conclusion

According to the embodiment described above, the holder attachment 100 has the first attaching member 1, which is engageable with the tuning key T and the tension bolt D4. Thus, in conjunction with the rotation of the tuning key T, the tension bolt D4 can be rotated with the first attaching member 1 of the holder attachment 100. That is, the tension bolt D4 can be rotated with the holder attachment 100 attached to the tension bolt D4 of the drum D. In other words, the tension applied to the drum head D2 can be adjusted with the holder attachment 100 attached to the drum D. As a result, the tone of the drum D can be tuned with the holder attachment 100 attached to the drum D. Thus, a desired performance condition can be readily achieved.

Since the holder attachment 100 is attached to the head D41 of the tension bolt D4, the load of the holder attachment 100 and the load of the microphone M held by the holder attachment 100 are added on the tension bolt D4. However, one end of the axial body of the tension bolt D4 is screwed and fixed in the lug D5. Thus, the holder attachment 100 can be secured to the drum D. The screwed degree of the tension bolt D4 into the lug D5 does not vary unless the tension bolt D4 rotates. That is, even if the load of the holder attachment 100 is added on the tension bolt D4, for example, the rim D3 does not move relative to drum shell D1, and thus the tension applied to the drum head D2 does not vary. As described above, the holder attachment 100 reduces effects on the tension applied to the drum head D2.

The holder attachment 100 according to the present invention may have a regulator to prevent the holder attachment 100 attached to the tension bolt D4 from rotating (turning) around the axis of the tension bolt D4.

Figure 10:
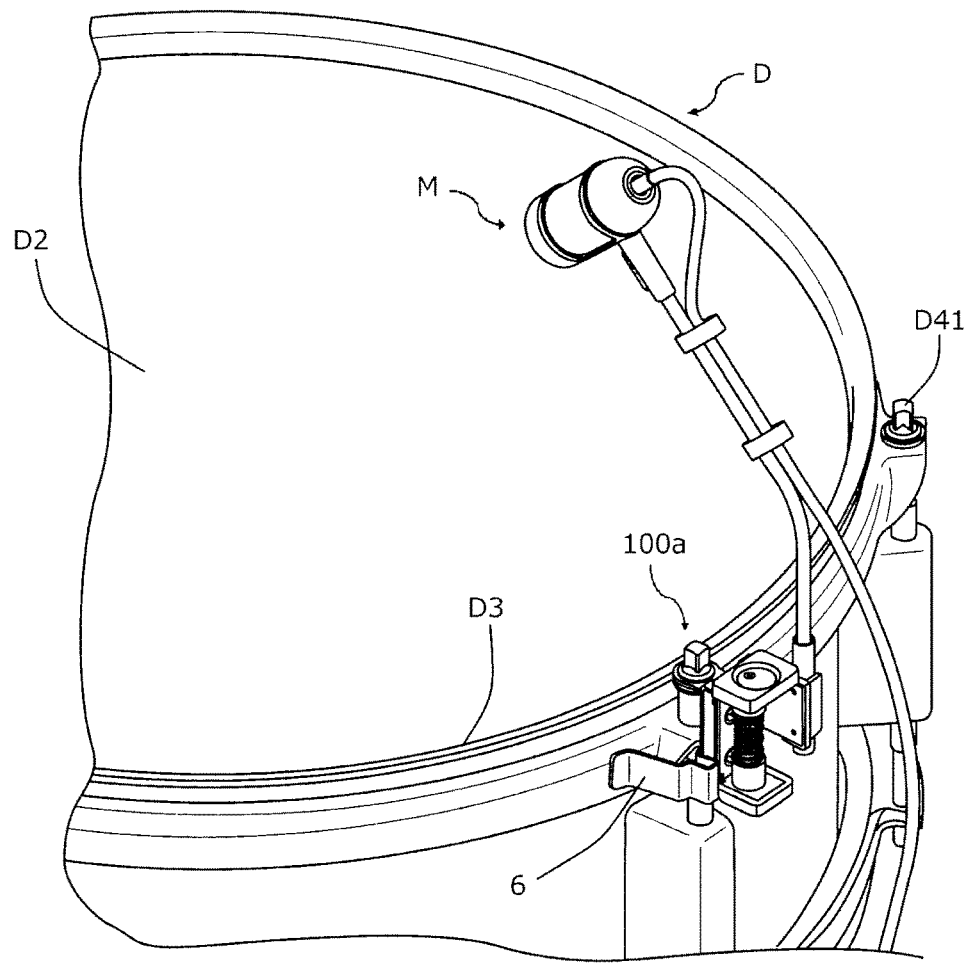
FIG. 10 is a perspective view illustrating another embodiment of a holder attachment for a drum according to the present invention, attached to a drum.

FIG. 10 is a perspective view illustrating another embodiment of a holder attachment according to the present invention. In FIG. 10, a holder attachment 100a is attached to the drum D.

Figure 11:
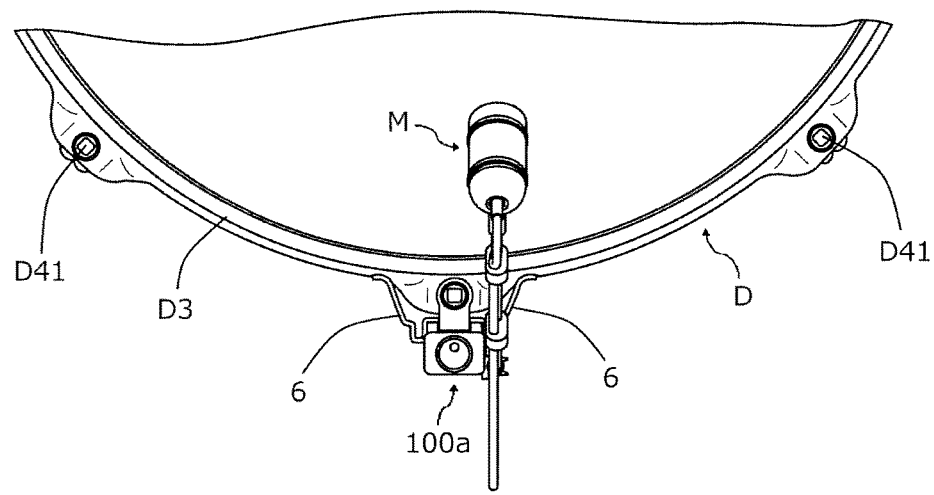
FIG. 11 is a plan view of the holder attachment for the drum in FIG. 10, attached to the drum.

FIG. 11 is a plan view of the holder attachment 100a of FIG. 10. In FIG. 11, the holder attachment 100a is attached to the drum D.

The holder attachment 100a according to the present embodiment is different from the holder attachment 100 described above in that the holder attachment 100a additionally has a supporting leg 6. The supporting leg 6 is one example of the regulator described above. The supporting leg 6 is a partially bent plate. The supporting leg 6 clamps, at a central portion in its longitudinal direction, the vertical portion 42c of the second support 42. The supporting leg 6 is in contact with the rim D3 at the two longitudinal ends. Since the two ends of the supporting leg 6 are in contact with the rim D3, the holder attachment 100a attached to the tension bolt D4 does not rotate around the axis of the tension bolt D4 in conjunction with the rotation of the tension bolt D4.

Holder Attachment for a Drum (2)

Still another embodiment of the holder attachment for a drum according to the present invention will now be described. The following description mainly focuses on the differences from the embodiments of the holder attachments described above.

Figure 12:
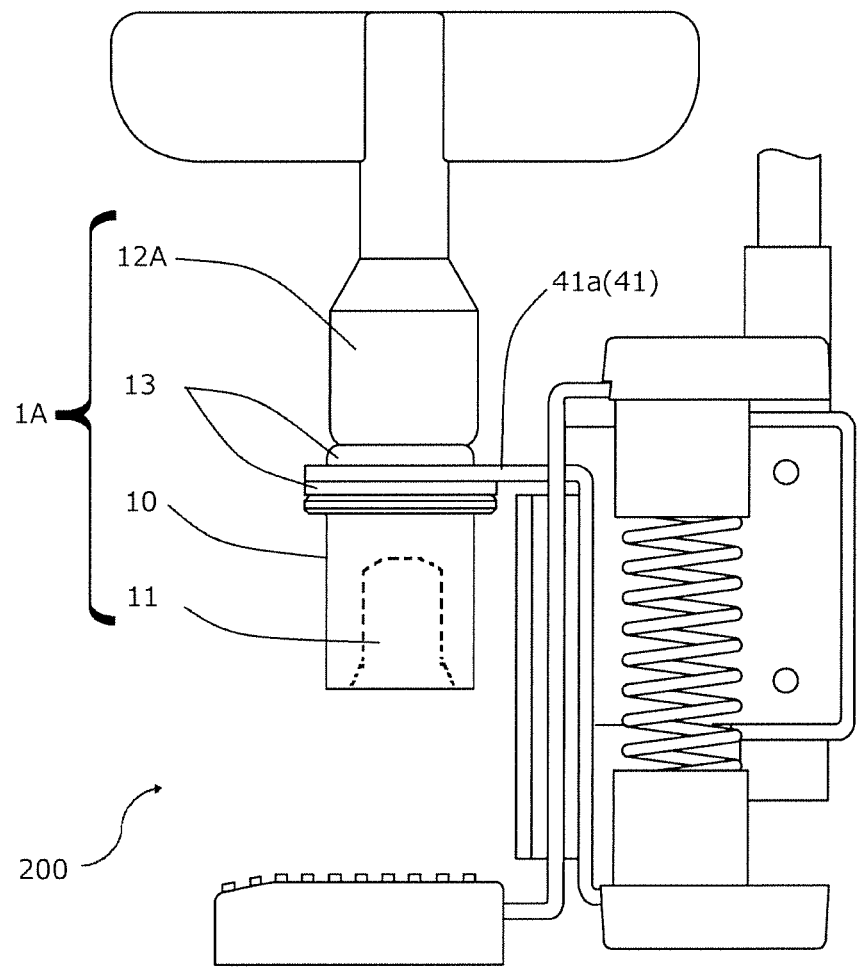
FIG. 12 is a front view illustrating still another embodiment of a holder attachment for a drum according to the present invention.

FIG. 12 is a front view illustrating another embodiment of the holder attachment for a drum according to the present invention in use.

A holder attachment for a drum (hereinafter referred to as "holder attachment") 200 according to the present embodiment is different from the holder attachment 100 according to the embodiment described above in that the holder attachment 200 has the function of the tuning key for rotating the tension bolt D4.

The holder attachment 200 includes a first attaching member 1A. The difference between the holder attachment 200 and the holder attachment 100 described above is only in that the holder attachment 200 has the first attaching member 1A that is different from the first attaching member 1.

The first attaching member 1A includes a body 10, a first engaging portion 11, a rotation facilitator 12A, and a support 13.

The structure of the body 10 of the holder attachment 200 is the same as that of the body 10 of the holder attachment 100. The structure of the first engaging portion 11 of the holder attachment 200 is the same as that of the first engaging portion 11 of the holder attachment 100. The shape of the top (the upper portion in FIG. 12) of the rotation facilitator 12A is substantially the same as that of the tuning key T described above. That is, the rotation facilitator 12A has a shape of an integrated component of the first attaching member 1 and the tuning key T of the holder attachment 100. The structure of the support 13 of the holder attachment 200 is the same as that of the support 13 of the holder attachment 100.

The rotation facilitator 12A is turned (rotates) with the fingers of the user of the holder attachment 200. In conjunction with the rotation of the rotation facilitator 12A, the first attaching member 1A rotates in the same direction as the rotation facilitator 12A. In conjunction with the rotation of the first attaching member 1A, the tension bolt D4 engaged with the first engaging portion 11 rotates in the same direction as the first attaching member 1A. As a result, the tension applied to the drum head D2 is adjusted.

Conclusion

According to the embodiment described above, the holder attachment 200 includes the rotation facilitator 12A for rotating the tension bolt D4. Thus, the tension applied to the drum head D2 can be adjusted only with the holder attachment 200, without using a tuning key T.

The invention claimed is:

1. A holder attachment for a drum comprising:
    a holding part configured to hold a component to be attached to the drum; and
    an attaching unit to be attached to a tension bolt of the drum, wherein the holding part is connected to the attaching unit, wherein
    the attaching unit comprises:
        a first attaching member configured to be disposed above a rim of the drum, the rim of the drum supporting the tension bolt of the drum; and
        a second attaching member configured to be disposed below the first attaching member wherein
        the first attaching member comprises:
            a first engaging portion to engage with a head of the tension bolt of the drum; and
            a second engaging portion to engage with a tuning key for rotating the first tension bolt of the drum, and
        wherein the first engaging portion is configured to rotate the tension bolt of the drum in conjunction with an operation of the tuning key engaging with the second engaging portion.

2. The holder attachment for the drum according to claim 1, wherein the first engaging portion has an opening into which the head of the tension bolt of the drum is insertable.

3. The holder attachment for the drum according to claim 1, wherein the second engaging portion is configured to be inserted in a socket of the turning key to engage with the tuning key.

4. The holder attachment for the drum according to claim 1, further comprising a rotation facilitator configured to rotate the tension bolt of the drum engaging with the first engaging portion.

5. The holder attachment for the drum according to claim 4, wherein the rotation facilitator is integrated with the first engaging portion.

6. The holder attachment for the drum according to claim 1, further comprising a distance adjuster to adjust a distance between the first attaching member and the second attaching member.

7. The holder attachment for the drum according to claim 6, wherein
    the distance adjuster comprises:
        a first adjuster segment connected to the first attaching member; and
        a second adjuster segment connected to the second attaching member, and
    wherein the distance between the first attaching member and the second attaching member varies as a distance between the first adjuster segment and the second adjuster segment varies.

8. The holder attachment for the drum according to claim 7, further comprising a support rotatably supporting the first attaching member, wherein
    the first adjuster segment is connected to the first attaching member with the support.

9. The holder attachment for the drum according to claim 7, further comprising a biasing member biasing the first adjuster segment and the second adjuster segment in opposite directions,
    wherein the attaching unit is configured to be attached to the tension bolt of the drum by a biasing force of the biasing member.

10. The holder attachment for the drum according to claim 9, wherein the distance between the first attaching member and the second attaching member increases as the distance between the first adjuster segment and the second adjuster segment decreases against the biasing force of the biasing member.

11. The holder attachment for the drum according to claim 1, wherein the second attaching member has a surface configured to be in contact with the rim of the drum.

12. The holder attachment for the drum according to claim 1, wherein the second attaching member comprises a clamping portion to clamp the tension bolt of the drum.

13. The holder attachment for the drum according to claim 11, wherein the second attaching member comprises a frictional member on a surface configured to be in contact with the rim of the drum, the frictional member configured to increase a frictional coefficient with the rim of the drum.

14. The holder attachment for the drum according to claim 1, further comprising a regulator preventing the holder attachment for the drum from rotating around an axis of the tension bolt of the drum.

15. A holder attachment for a drum comprising:
    a holding part configured to hold a component to be attached to the drum;

an attaching unit to be attached to a tension bolt of the drum, wherein the holding part is connected to the attaching unit; and a distance adjuster, wherein
the attaching unit comprises:
a first attaching member configured to be disposed above a rim of the drum, the rim of the drum supporting the tension bolt of the drum; and
a second attaching member configured to be disposed below the first attaching member, and
the distance adjuster comprises:
a first adjuster segment connected to the first attaching member; and
a second adjuster segment connected to the second attaching member, and
wherein the distance between the first attaching member and the second attaching member varies as a distance between the first adjuster segment and the second adjuster segment varies.

16. The holder attachment for the drum according to claim 15, further comprising a biasing member biasing the first adjuster segment and the second adjuster segment in opposite directions,
wherein the attaching unit is configured to be attached to the tension bolt of the drum by a biasing force of the biasing member.

17. The holder attachment for the drum according to claim 16, wherein the distance between the first attaching member and the second attaching member increases as the distance between the first adjuster segment and the second adjuster segment decreases against the biasing force of the biasing member.

* * * * *